March 23, 1943.  G. S. SCHWARTZ  2,314,521
ILLUMINATED ARTIFICIAL BAIT HOLDER
Filed Jan. 20, 1942  2 Sheets-Sheet 1
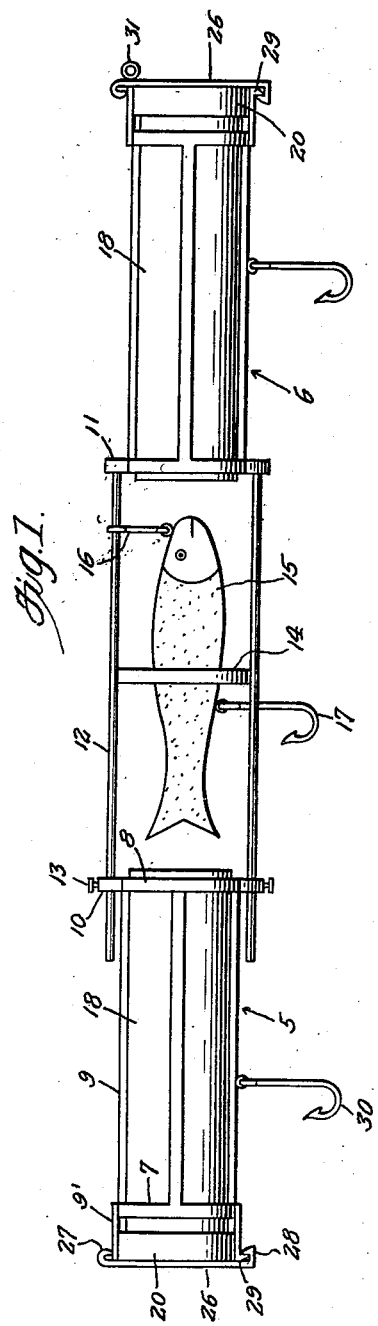
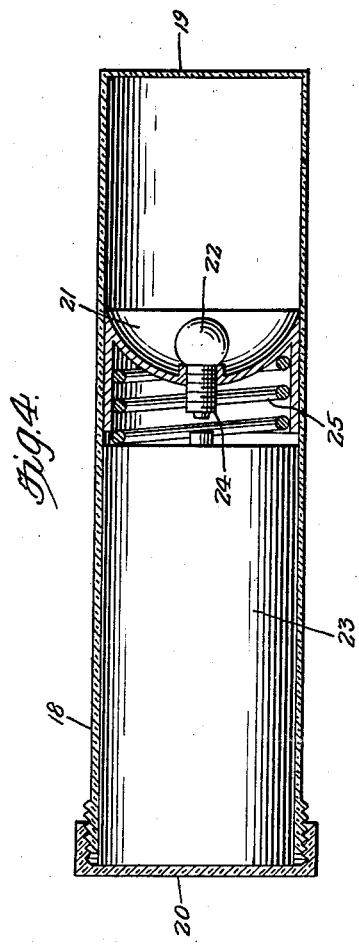
Inventor
George Simpson Schwartz.
By Clarence A. O'Brien
and Harvey B. Jacobson
Attorney March 23, 1943.　　　G. S. SCHWARTZ　　　2,314,521
ILLUMINATED ARTIFICIAL BAIT HOLDER
Filed Jan. 20, 1942　　　2 Sheets-Sheet 2
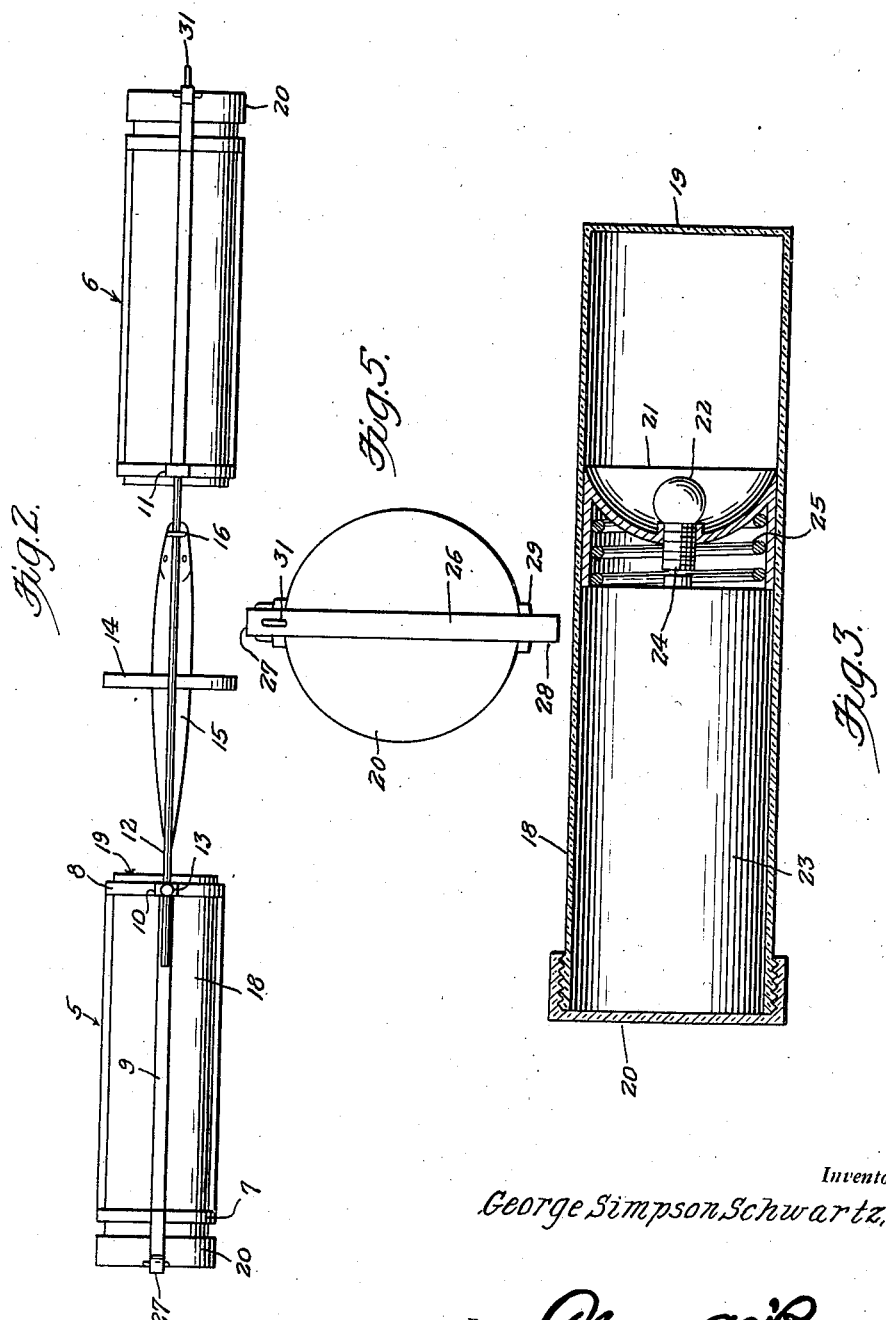
Inventor
George Simpson Schwartz,
By Clarence A. O'Brien
and Harvey B. Jacobson
Attorney Patented Mar. 23, 1943

2,314,521

UNITED STATES PATENT OFFICE 2,314,521

ILLUMINATED ARTIFICIAL BAIT HOLDER

George Simpson Schwartz, Brownwood, Tex.

Application January 20, 1942, Serial No. 427,496

5 Claims. (Cl. 43—44)

The present invention relates to new and useful improvements in bait holders adapted for holding artificial bait and the invention has for its primary object to provide means for illuminating the bait to more prominently display the bait.

A further object is to provide an artificial bait holder of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is a longitudinal sectional view of one of the flashlight containers.

Figure 4 is a similar view showing the battery of the flashlight out of contacting position, and Figure 5 is an end elevational view of the holder.

Referring now to the drawings in detail wherein for the purpose of illustration I have disclosed a preferred embodiment of the invention, the numerals 5 and 6 designate a pair of cylindrical frames each of substantially identical construction and composed of ring members 7 and 8 connected by longitudinal frame members 9. The inner ring member 8 of the frame 5 is provided with radially extending lugs 10 while the inner ring member of the frame 6 is provided with radially extending lugs 11. Secured to the lugs 11 are rods 12 slidably inserted through the lugs 10 of the frame member 5 and secured in position therein by set screws 13. The intermediate portions of the rods 12 are also connected by a ring member 14.

The artificial bait designated at 15 is positioned between the rods 12 centrally of the ring member 14 and is suspended from one of the rods at the head of the fish by a hanger or hook member 16. To the underside of the bait 15 is suspended a fish hook 17.

Positioned in each of the frame members 5 and 6 is a transparent flashlight casing 18 of cylindrical form, the casing being closed at one end by a transparent end wall 19 and is closed at its other end by a threaded cap 20.

Fixedly secured in the casing 18 is a reflector 21 having the bulb 22 mounted therein and behind the bulb is positioned the flashlight battery 23 adapted for movement into engagement with the contact 24 at the base of the bulb to close the circuit therewith. A coil spring 25 is interposed between the reflector 21 and the battery to urge the battery away from the bulb, the threading home of the cap 20 serving to move the battery 23 into contacting engagement, as will be apparent from an inspection of Figure 3 of the drawings.

The casings 18 are secured in position in their respective frames by a transversely extending bar 26 connected to the outer ends of longitudinal frame extensions 9' secured to the outer rings 7, one end of the bar 26 being pivoted as at 27 to one of the extensions and the other end of the bar 26 having a catch 28 for engaging a lug 29 carried by the other extension 9' to secure the bar in position across the end of the casing 18 to retain the latter in position in the frame. The transverse bar 26 is spaced outwardly from the ring member 7 to accommodate the cap 20 therebetween to secure the casing 18 against displacement from the frame. The inner end of the casing serves to illuminate the adjacent end of the artificial bait 15 in a manner as will be apparent.

Also suspended from the frames 5 and 6 are hooks 30 and the bar 26 at the outer end of the frame 6 is also provided with a fish line attaching eye 31.

It is believed the details of construction, operation and advantages of the device will be readily understood from the foregoing without further detailed explanation.

Having thus described the invention what I claim is:

1. A fish bait holder comprising an open frame, adapted for containing the bait in position therein, flashlight holders at each end of the frame, each holder being adapted to support a flashlight casing, and means connecting one of the holders to the frame for adjustment of said one holder relative to the other holder.

2. A fish bait holder comprising an open frame adapted for containing the bait, and a holder at each end of the frame adapted for receiving illuminating means, one of said holders being secured to the frame in adjustably spaced relation relative to the other holder.

3. A fish bait holder comprising an open frame adapted for containing the bait, a flashlight holder carried by the frame adapted for receiving a flashlight casing, and means at the outer end of the holder for securing the flashlight in the holder.

4. A fish bait holder comprising an open frame adapted for containing the bait in position therein, a flashlight holder at each end of the frame, each holder being adapted to support a flashlight casing which includes a screw cap for controlling energization of the flashlight, and means carried by each holder providing a working cage for an adjacent cap.

5. A fish bait holder comprising an open frame adapted for containing the bait in position therein, a flashlight holder at each end of the frame, each holder being adapted to support a flashlight casing which includes a screw cap for controlling energization of the flashlight, and spaced members carried by each holder and between which an adjacent cap is freely manipulable.

GEORGE SIMPSON SCHWARTZ.